(12) United States Patent
Mansir et al.

(10) Patent No.: US 12,398,631 B2
(45) Date of Patent: Aug. 26, 2025

(54) CURRENT BALANCING FOR WELLBORE ARTIFICIAL LIFT DEVICE

(71) Applicant: Halliburton Energy Services, Inc., Houston, TX (US)

(72) Inventors: Hassan Mansir, Maidenhead (GB); Tom Yohanan, Sand Springs, OK (US); John Badawi, Camberley (GB)

(73) Assignee: HALLIBURTON ENERGY SERVICES, INC., Houston, TX (US)

( * ) Notice: Subject to any disclaimer, the term of this patent is extended or adjusted under 35 U.S.C. 154(b) by 146 days.

(21) Appl. No.: 18/215,867

(22) Filed: Jun. 29, 2023

(65) Prior Publication Data

US 2025/0003319 A1    Jan. 2, 2025

(51) Int. Cl.
- *E21B 43/12*   (2006.01)
- *F04D 13/10*   (2006.01)
- *H02P 21/18*   (2016.01)

(52) U.S. Cl.
CPC ............ *E21B 43/128* (2013.01); *H02P 21/18* (2016.02); *F04D 13/10* (2013.01)

(58) Field of Classification Search
CPC ........ E21B 43/128; H02P 21/18; H02P 27/04; F04D 13/10; B65H 2403/11; B65H 2403/82
See application file for complete search history.

(56) References Cited

U.S. PATENT DOCUMENTS

| | | |
|---|---|---|
| 7,819,183 B2 | 10/2010 | Borgstadt |
| 9,054,611 B2 | 6/2015 | Liu et al. |
| 10,389,287 B2 | 8/2019 | Ademoye |
| 2009/0256519 A1 | 10/2009 | Thompson et al. |
| 2017/0045055 A1 | 2/2017 | Hoefel et al. |
| 2019/0204467 A1 | 7/2019 | Curt et al. |

(Continued)

FOREIGN PATENT DOCUMENTS

CN         115478778 A         12/2022

OTHER PUBLICATIONS

Orfanoudakis "Current balancing of scalar-controlled induction motors with imbalanced cables", 2022, IEEE (Year: 2022).*

(Continued)

*Primary Examiner* — Bickey Dhakal
(74) *Attorney, Agent, or Firm* — Kilpatrick Townsend & Stockton LLP

(57) ABSTRACT

Processing device-based systems and methods for controlling an electric motor of an electric submersible pump system in a balanced current condition using a variable speed drive despite an impedance imbalance of an electric cable connecting the electric motor to the variable speed drive. The systems and methods can utilize estimated motor shaft angular position and speed values, as well as values of three-phase motor currents measured at an output of an inverter of the variable speed drive as input information. Positive-sequence and negative-sequence current components may be extracted from measured current values and compared to reference values. The system provides an overall voltage command in the abc reference frame to a pulse width modulation controller, which generates an inverter switching pattern that will control the electric motor of the electric submersible pump system in a balanced current condition.

20 Claims, 8 Drawing Sheets

(56) References Cited

U.S. PATENT DOCUMENTS

2019/0379205 A1* 12/2019 Orfanoudakis ......... H02P 6/182
2022/0181999 A1* 6/2022 Orfanoudakis ......... H02P 21/13

OTHER PUBLICATIONS

Thomas "Voltage and Cable Impedance Unbalance in Submergible Oil Well Pumps", 1984, IEEE, 97-104 (Year: 1984).*
International Search Report and Written Opinion, PCT/US2023/026521, Mar. 15, 2024, 11 pages.

* cited by examiner

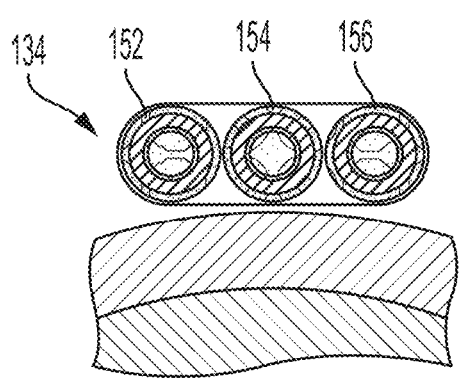
FIG. 2
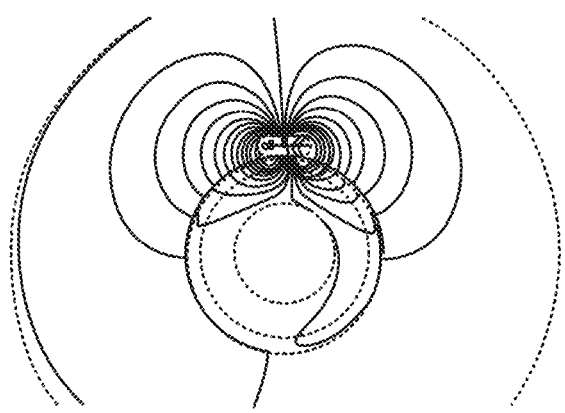
FIG. 3
|  | Phase A | Phase B | Phase C |
|---|---|---|---|
| Phase A | 1.0968 | 0.7361 | 0.5278 |
| Phase B | 0.7361 | 1.1208 | 0.7371 |
| Phase C | 0.5278 | 0.7371 | 1.1007 |
FIG. 4

CURRENT BALANCING FOR WELLBORE ARTIFICIAL LIFT DEVICE

TECHNICAL FIELD

The present disclosure relates generally to components for hydrocarbon well operations and, more particularly (although not necessarily exclusively), to electrical circuitry for selectively controlling the power to an artificial lift device for performing a wellbore operation.

BACKGROUND

Hydrocarbon well operators may use artificial lift systems to help extract well fluid from a wellbore. One type of such an artificial lift system is an electric submersible pump (ESP) system. In an ESP system, a pump is disposed within well fluid in a wellbore and operation of the pump transports the well fluid to the surface. An electric motor is also disposed in the wellbore to drive the pump. The electric motor is typically controlled by a drive controller that is located on the surface and electrically coupled to the motor by a cable. Given that it can be advantageous to operate the motor at different speeds, the drive controller may be a variable speed drive, such as a three-phase variable frequency drive that controls a three-phase electric pump motor.

In a typical three-phase ESP system application, the cable that supplies power to the pump motor from the variable speed drive at the surface is a flat cable, where the three conductors of the cable are located adjacent to each other and in the same plane to provide for a thinner cable geometry. Unfortunately, the impedance between the three conductors of such a flat cable, each of which supplies electrical energy to a given phase of the electric motor, is not typically balanced (especially in long cables). This imbalance, or impedance mismatch, between the conductors of the cable results in a supply of unbalanced electric currents to the electric motor, which in turn results in torque ripple and additional electrical losses that impact motor efficiency and energy utilization. The increased electrical losses and increased torque ripple due to the unbalanced currents also negatively impacts motor performance and can lead to shaft and coupling fatigue and possibly to premature failures.

BRIEF DESCRIPTION OF THE DRAWINGS

FIGS. 2-4 illustrate an impedance mismatch between conductors of an electric cable that can be used in an artificial lift system according to one example of the present disclosure.

DETAILED DESCRIPTION

Figure 1:
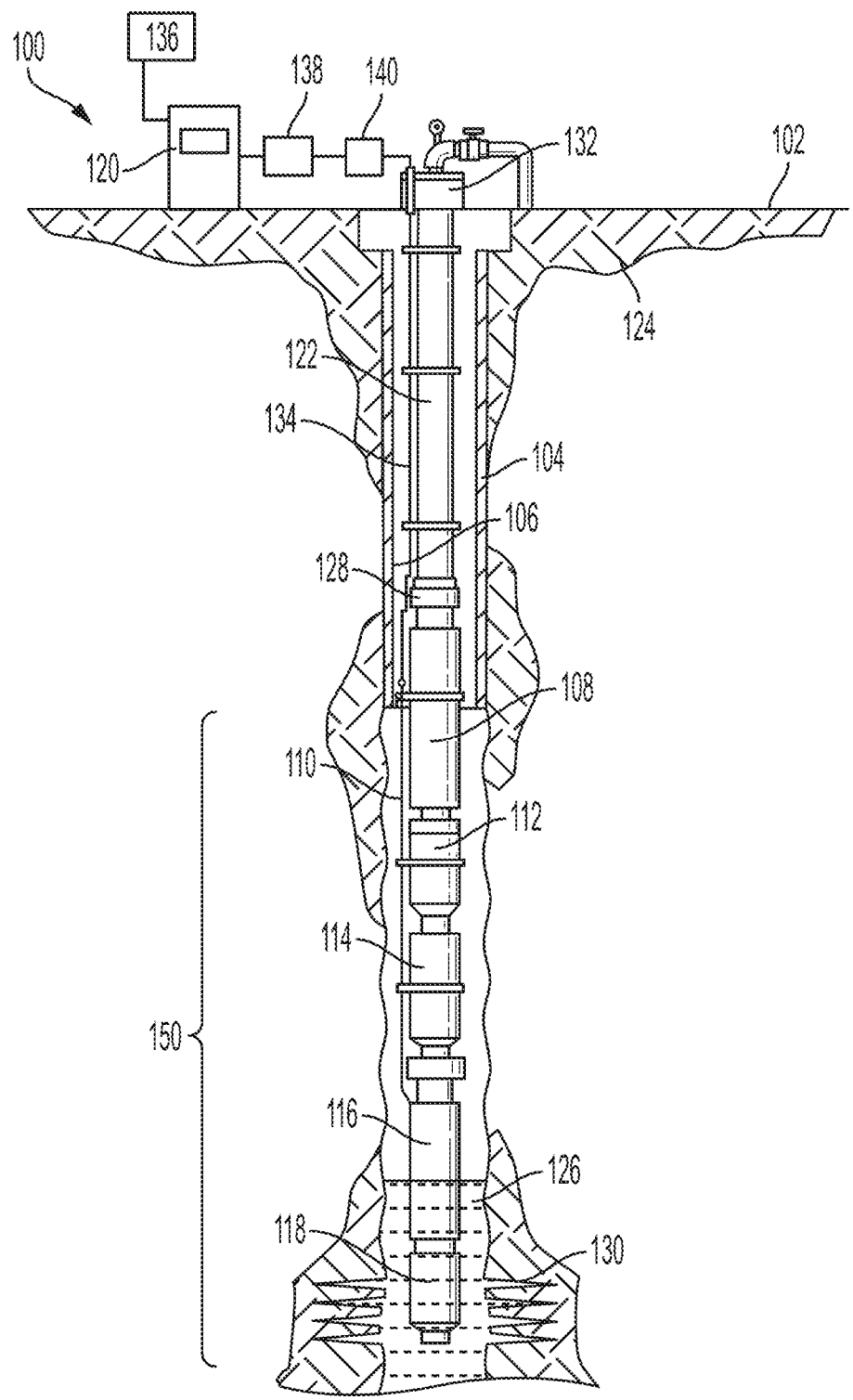
FIG. 1 is a schematic diagram of a variable speed motor-driven artificial lift device operating on a hydrocarbon wellbore according to one example of the present disclosure.

Certain aspects and examples of the present disclosure relate to wellbore artificial lift systems and, more specifically but not necessarily exclusively, to electric submersible pump (ESP) artificial lift systems. Examples according to the present disclosure can overcome problems resulting from the impedance mismatch of the typically flat cables used to supply electrical energy to the pump motor of an ESP artificial lift system and to communicatively couple the pump motor to a variable speed drive at the surface of the wellbore. As such, examples according to the present disclosure can avoid increased electrical losses, premature component failures and other possible negative consequences associated with supplying unbalanced electric currents to the electric motor of an ESP artificial lift system.

Examples according to the present disclosure can generally employ the method of symmetrical components to contend with unbalanced currents present at a three-phase electric motor used to drive a pump of an ESP artificial lift system. As would be understood by one of skill in the art, the method of symmetrical components simplifies the analysis of unbalanced three-phase power systems. For example, the method of symmetrical components can be used to resolve unbalanced phase currents at a three-phase electric motor into a set of symmetrical components, or sets of phasors, including a balanced positive-sequence component, a balanced negative-sequence component, and a single-phase zero-sequence component. The three-phase electric motor system can thereby be effectively transformed, for purposes of analysis and control, into a stationary two-phase system. The uncoupled symmetrical components can be analyzed individually in a symmetrical component domain and then superposed to obtain the composite result.

Since each of the positive-sequence component and the negative-sequence components are balanced as a result of applying the method of symmetrical components, they can be transformed into their d and q components. As would also be understood by one of skill in the art, d, q refers generally to two-axis reference frame modeling of the transient behavior of an electric motor, where d stands for "direct" and q stands for "quadrature," and a reference coordinate system (frame) having a d-axis and a q-axis separated by a torque angle can be applied to, and rotate with, the rotor of the electric motor to simplify analysis. In d, q reference frame modeling, the d, q currents are steady-state direct currents (DC), which also simplifies motor control theory.

Accordingly, examples of the present disclosure can incorporate the aforementioned techniques as part of a more complex overall method of balancing current and voltage at the terminals of an ESP artificial lift system pump motor that is located in a wellbore. The electric pump motor can be a three-phase electric motor. Phase currents can be measured at the variable speed drive communicatively coupled to the motor, and the phase currents can be resolved into their positive, negative and zero sequence components. The electric motor of an ESP artificial lift system is typically a three-phase electric motor with a floating neutral, where no zero-sequence phase current is present. Consequently, as should be understood from the foregoing description, some examples may address the problem of unbalanced currents by generating voltage commands that will drive the negative-sequence phase current to zero while controlling the positive-sequence phase (torque-producing) currents, which ultimately helps to ensure that both the current and the voltage are balanced at the terminals of the electric motor.

The positive-sequence d and q current components can be controlled, for example, by using a proportional-integral controller (PI controller) operating in a control loop to respectively output positive-sequence component voltage commands $vd^P$ and $vq^P$. Likewise, the negative-sequence d and q current components can be controlled by a PI controller operating in a control loop to respectively output negative-sequence voltage commands $vd^n$ and $vq^n$. For the negative-sequence component PI controller, the reference currents can be set to zero to ensure that the resulting voltage command reflects a balanced current condition. Each set of voltage commands ($vd^P$, $vq^P$) and ($vd^n$, $vq^n$) can be converted back into three-phase voltage commands and recombined to generate voltage commands that can be supplied to a pulse width modulation (PWM) controller.

When typical control systems encounter unbalanced currents, the voltages and currents converted to a d, q reference frame are no longer DC quantities, but instead oscillate at twice the supply frequency. This makes control somewhat difficult. By resolving such voltages and currents into balanced positive-sequence and negative-sequence components, d, q reference frame conversion according to examples of the present disclosure yields DC quantities that are much easier to control to a desired value. Examples according to the present disclosure also eliminate the need to know the impedance imbalance of the cable that supplies power from the variable speed drive to the electric motor of the ESP artificial lift system, which impedance imbalance is typically difficult to assess due to variability between ESP completions and the proximity of the cable to the pump or well casing.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 schematically depicts a hydrocarbon well 100 according to one example of the present disclosure. The well 100 includes a wellbore 104 extends from the surface 102 into a subterranean formation 124. The wellbore 104 can be a first wellbore in a set of wellbores of a multi-well pad or other suitable structure or system. The wellbore 104 can include a casing 106 or other suitable component (e.g., a tubing string, etc.) that can transport produced fluid from the wellbore 104 to the surface 102. The outflow of fluid from the wellbore 104 may be transferred to a downstream location via a flow line or a similar conduit.

An artificial lift system in the form of an electric submersible pump (ESP) system 150 is located within a casing 106 of the wellbore 104 and operates to assist with movement of wellbore fluid from a downhole location in the wellbore 104 to the surface 102 through a wellhead 132. Artificial lift devices and systems such as the ESP system 150 may be used, for example, to help maintain a fluid flow from a wellbore in which subterranean pressures have decreased over time.

The ESP system 150 of this example includes an electric motor 116 that is coupled to and drives a centrifugal pump 108. Operation of the pump 108 by the electric motor 116 causes the pump 108 to draw in wellbore fluid and to transport the wellbore fluid to the surface 102 via production tubing 122 and through the wellhead 132, whereafter the wellbore fluid may be transported to surface production facilities, etc. The ESP system 150 may also include, for example, an electric cable 110 that connects the electric motor 116 to the pump 108, an optional gas separator 112, a seal section or equalizer 114, and a sensor package 118.

The electric motor 116 can be controlled by a variable speed drive, such as a variable speed drive 120, that may be located on the surface 102 and can be electrically coupled to the electric motor 116 by a three-phase electric cable 134. The variable speed drive 120 allows the electric motor 116, and consequently the pump 108, to be selectively operated at different speeds. In some examples, the three-phase electric cable 134 may provide both power and control signals to the electric motor 116. The three-phase electric cable 134 may be clamped to the outside of the production tubing 122, and may exit the wellbore 104 through the wellhead 132, such as through the use of feedthrough connectors.

The electric motor 116 receives electric power from an electrical energy source 136 via the three-phase electric cable 134. Prior to being received by the electric motor 116, the electric power from the electrical energy source 136 is first converted by the variable speed drive 120 to a variable frequency and a variable voltage required by the electric motor 116. The voltage is then increased by a step-up transformer 138 to the actual voltage needed by the electric motor 116, allowing for a voltage drop in three-phase electric cable 134. The output of step-up transformer 138 is connected to the three-phase electric cable 134 in a vented junction box 140.

FIGS. 2-4 collectively illustrate an impedance imbalance between the conductors 152, 154, 156 of the three-phase electric cable 134 example of FIG. 1, which is used to supply electrical energy to the electric motor 116 of the ESP system 150 of FIG. 1. The electric cable 134 is what may be referred to as a flat cable, with each of the three conductors 152, 154, 156 used to respectively supply one of the three phase currents to the electric motor 116 located adjacent to each other and in the same plane.

The adjacent and same-plane arrangement of the conductors 152, 154, 156 of the three-phase electric cable (hereinafter also electric cable) 134 results in a thin cable geometry that will fit within the limited space of the annulus between the electric motor 116 and the casing 106 of the wellbore 104. The flat geometry of the electric cable 134 also renders the electric cable 134 more flexible than a round cable, which makes the electric cable 134 easier to install and maneuver in the confined spaces of wellbore environments, and the additional flexibility reduces the risk of damage to the electric cable 134 due to bending. Further, the flat geometry of the electric cable 134 also produces a larger surface area than a comparable round cable, which imparts the electric cable 134 with better heat dissipation properties, which can be important in a wellbore environment where temperatures can be very high, as excessive heat can damage the insulation of the electric cable 134 and lead to system failures.

Unfortunately, a drawback of the flat geometry of electric cable 134 is that the impedance of the electric cable 134 can be unbalanced as a result of its physical structure. More specifically, unlike a round cable, which has a circular cross-section and a uniform distribution of conductive material around its circumference, the side-by-side, single plane arrangement of the conductors 152, 154, 156 of the electric cable 134 can result in different inductances and capacitances between the conductors 152, 154, 156 themselves, and also between the conductors 152, 154, 156 and cable armor or a ground structure with which the electric cable 134 may be associated. This difference in inductance and capacitance creates a difference in the characteristic impedance of each conductor 152, 154, 156, which can lead to an unbalanced impedance in the electric cable 134. In addition, flat cables like the electric cable 134 of FIG. 1, may also have variations in the spacing and thickness of the conductors 152, 154, 156. These variations can result in differences in the inductance and capacitance of each conductor, further contributing to impedance imbalances. The conductor impedance imbalance of the electric cable 134 in this example is graphically represented in FIG. 3, and numerically represented in the table of FIG. 4.

The unbalanced impedance of the electric cable 134 can cause unbalanced voltage drop, voltage distortion, and imbalances in the motor currents, which can affect the performance of the electric motor 116 of the ESP system 150 and potentially lead to equipment failure. To address this issue, the electric cable 134 can be shielded or grounded and cab be designed with special insulation materials and construction techniques to withstand the harsh operating conditions of hydrocarbon wells. However, grounding and shielding alone cannot eliminate the nature of motor current imbalance driven by the inherent structural nature of the electric cable 134 flat geometry.

Figure 5:
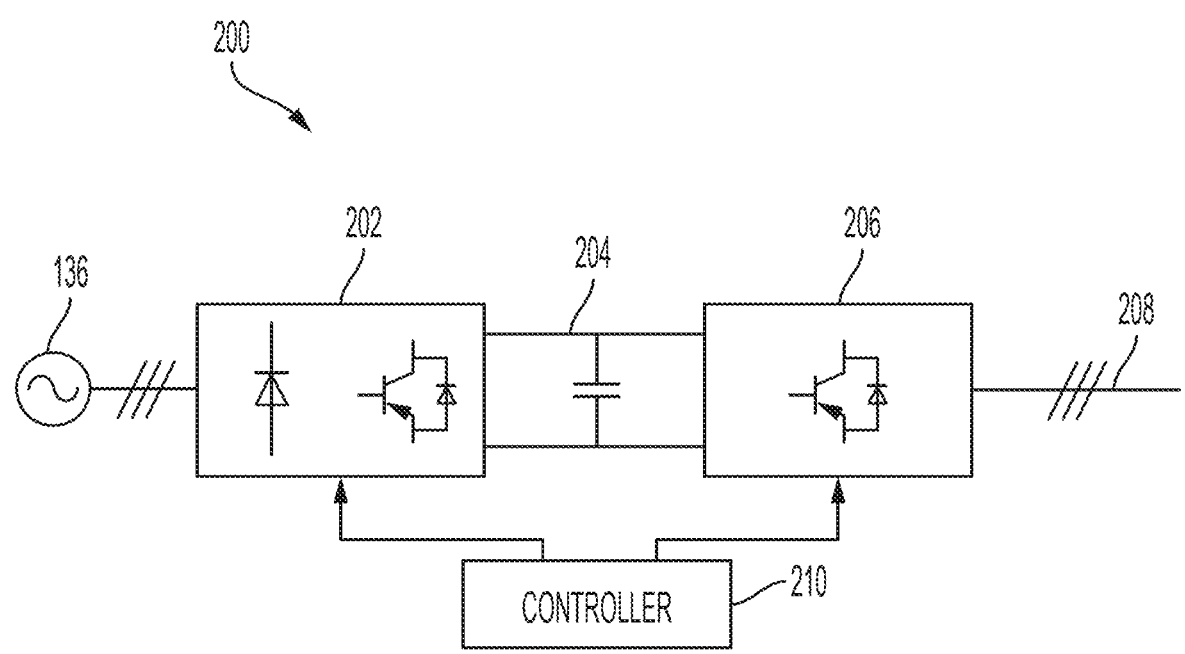
FIG. 5. is a block diagram representing the architecture of a variable speed drive for an industrial motor according to one example of the present disclosure.

FIG. 5 is a block diagram representing the architecture of a variable speed drive 200 for an industrial motor according to one example of the present disclosure. Variable speed (frequency) drives, such as the variable speed drive 200 of FIG. 5 (or the variable speed drive 120 of FIG. 1), commonly use pulse-width modulation (PWM) to generate output voltages and currents that are approximately sinusoidal in nature.

The variable speed drive 200 represented in FIG. 5 can be observed to comprise three main components: a rectifier 202, a DC bus 204 supported by storage capacitors, and an inverter 206. The rectifier 202 converts incoming AC power, such as from the electrical energy source 136 of FIG. 1, to DC power that is stored at the DC bus 204. The AC power rectification can be passive, such by using diodes, or active, such as by using insulated-gate bipolar transistors (IGBTs), for example. After rectification, the inverter 206 employs PWM to convert the DC power back to AC power at a variable frequency and voltage that is suitable for the motor 208 being controlled by the variable speed drive 200. As would be understood by one of skill in the art, PWM operates by first converting the DC voltage into a square wave, which has a fixed amplitude but varying pulse widths. The DC voltage is turned on and off at a very high frequency, which is commonly referred to as the PWM switching frequency. The ratio of the distribution of pulses, and their on-time to off-time, determines the magnitude and the profile of the voltage that is output to the load (e.g., motor). By controlling the pulse width, the amplitude of the output voltage can be adjusted. By varying the cycle frequency of the pulses, the output frequency of the AC waveform can also be changed. To generate the pulse-width modulated variable frequency and voltage, the inverter 206 of the variable speed drive 300 of FIG. 5 can switch between lower and upper bus voltages to produce output voltage pulses that are supplied to the motor 208, with the duty cycle (i.e., the percentage of time the voltage is on) determining the root mean square of the voltage supplied to the motor 208 over a cycle.

The rectifier 202 and the inverter 206 can be controlled by a controller 210. The controller 210 may include a microcontroller or another programmable device that reads inputs from sensors and uses the sensor input information to adjust the PWM signal sent to the power stages of the inverter 206, which may include transistors or other switching devices that are turned on and off rapidly to generate the PWM signal and control the voltage supplied and the current flowing to the motor 208.

In the example of the variable speed drive 200 represented in FIG. 5, the voltage at the DC bus 204, which is supported by a bank of capacitors, is generally at a fixed magnitude that corresponds to the rectified voltage from the electrical energy source 136. The pulsed output voltages to the motor 208 are normally of constant amplitude and equal to the bus voltage. A PWM control algorithm, which can be executed by the controller 210, varies the duration of the pulses to produce an average voltage in each switching cycle that is approximately equal to the amplitude of the actual sinewave voltage. The PWM technique is able to generate high-quality sine wave output that is suitable for powering motors, such as the electric motor 116 of the ESP system 150. By controlling the pulse width and frequency of the output waveform, the inverter can produce a sine wave that closely approximates the ideal sine wave of AC power.

In light of the above-described potential problems, controlling an electric motor of an ESP system via a variable speed drive can be generally accomplished in several ways. For example, it is possible to employ a scalar control technique, which consists of adjusting the magnitude of voltages applied to the electric motor as a function of the supply frequency. Scalar control is an open loop control method, and does not require knowledge of the electric motor's rotor position. It is also possible to employ a vector control technique. However, vector control of an electric motor usually requires knowledge of the electric motor's rotor angular position in order to adjust the phase of the current in relation to the location of the rotor poles, and it is difficult to determine the rotor angular position of an electric motor in an ESP system due to the downhole location of the electric motor. Consequently, an estimation of the rotor angular position may be used instead, for example by providing measurements of motor quantities observed at the surface to a motor model. Control methods according to examples of the present disclosure can be implemented on a vector control technique to control a downhole electric motor of an ESP system in a manner that eliminates the above-described motor current imbalance.

According to examples of the present disclosure, a system implementing an electric motor control method that eliminates motor current imbalance can employ a symmetrical components technique that resolves the three-phase currents into balanced positive and negative sequence components. A control method according to the present disclosure minimizes the negative sequence currents present in the motor current by controlling the PWM on each of the motor phases to that end.

The three-phase currents can be resolved into balanced positive and negative sequence components by, for example, performing an extraction operation on measured quantities.

Several types of extraction operation techniques may be employed for this purpose, such as but not necessarily limited to, Second Order Generalized Integrator (SOGI)-Phase Lock loop (PLL) or Delayed Signal Cancelation (DSC) techniques.

Figure 6:
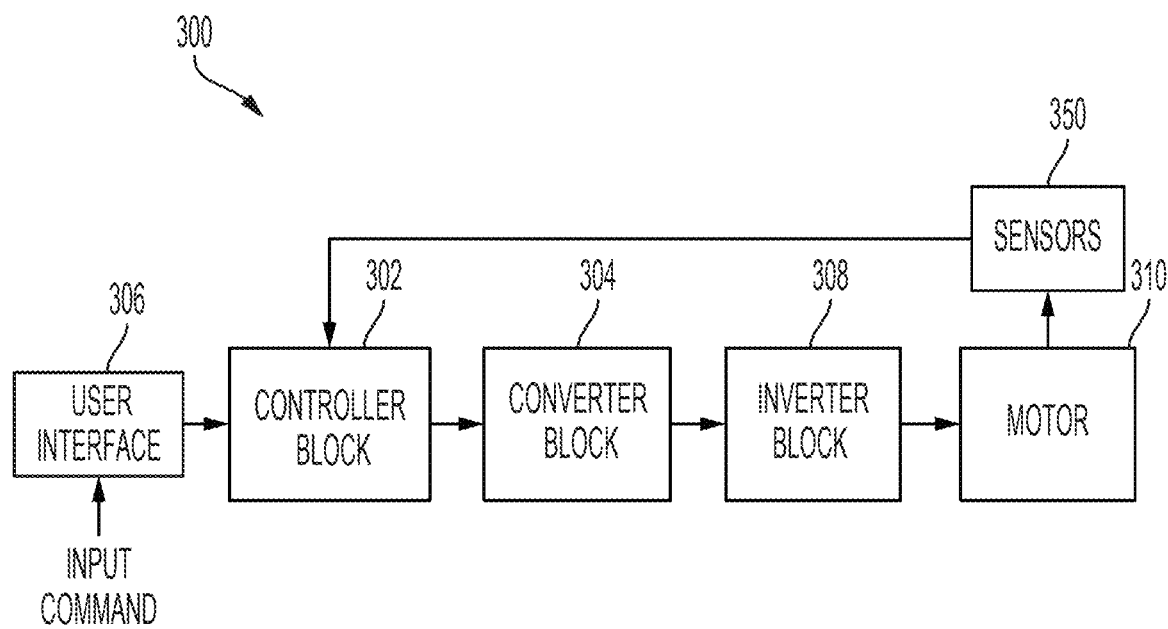
FIG. 6 is a functional block diagram of a system for balancing supplied electric currents against the unbalanced impedance of a power cable according to one example of the present disclosure.

FIG. 6 is a functional block diagram of one example of a control system of a variable speed drive 300 for balancing unbalanced phase currents of a three-phase electric motor 310 of a wellbore ESP artificial lift system, such as may be caused, for example, by an electric cable having an impedance imbalance between conductors. The control system of the variable speed drive 300 may include, for example and without limitation, a controller block 302, a converter block 304, and an inverter block 308. The controller block 302 can receive signals from one or more sensors 350 related to various electric motor parameters. For example, the sensors 350 may measure the three phase currents at the electric motor 310 and report the phase currents to the controller block 302. The controller block may also receive commands from a user interface 306 that is communicatively coupled to the controller block 302.

The controller block 302 can use the measured phase currents received from the sensors 350, voltage commands generated within the converter block 304, and input commands received from the user interface to generate an overall voltage command that can be supplied to a PWM controller of the control block 302. The voltage commands can cause the PWM controller of the control block 302 to issue switching commands to an inverter block 308 to generate an inverter switching pattern that will control the electric motor 310 of the ESP system in a balanced current condition.

Figure 7:
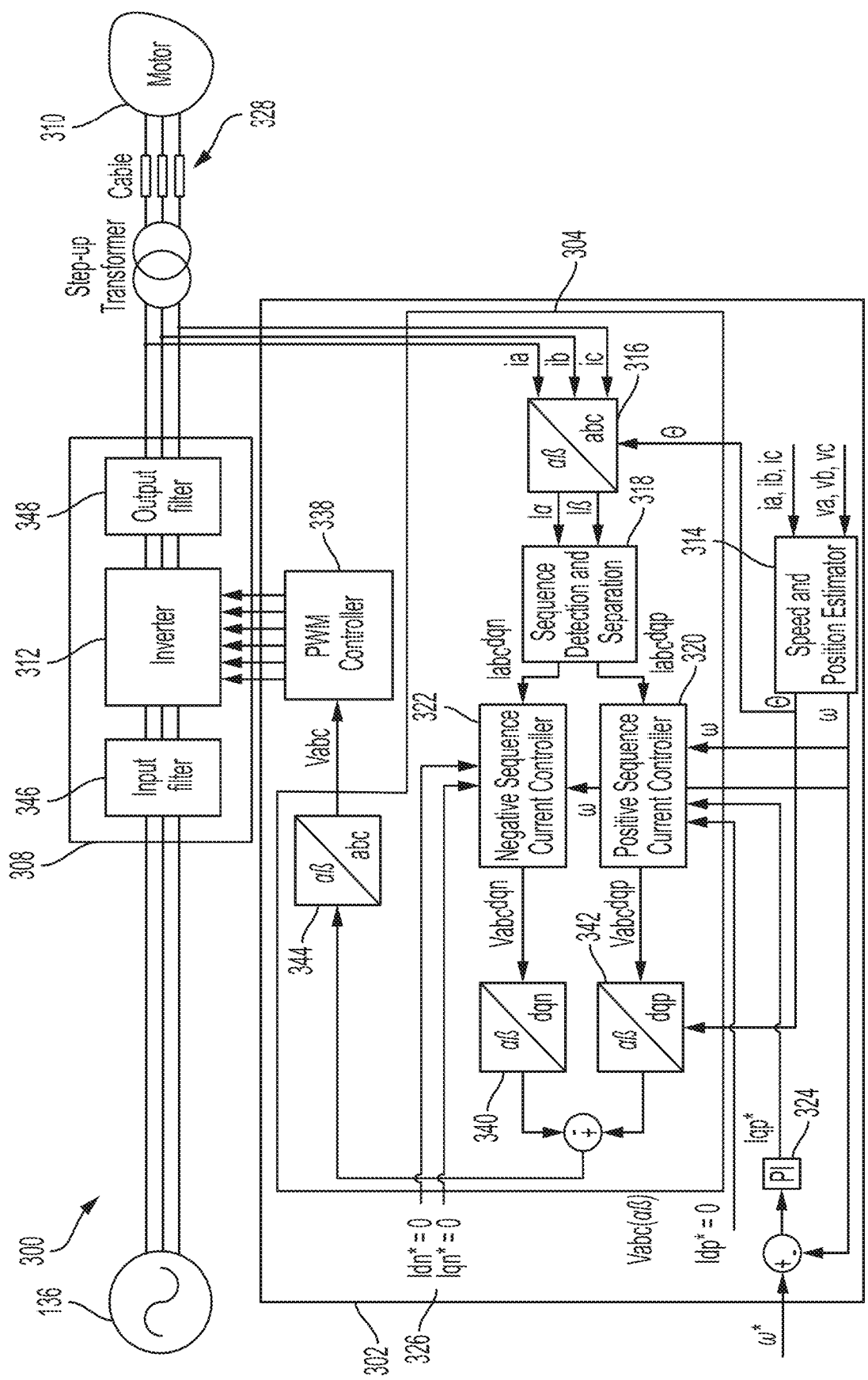
FIG. 7 is a schematic electrical circuit diagram of a system for balancing supplied electric currents against the unbalanced impedance of a power cable according to one example of the present disclosure.

FIG. 7 is a schematic diagram of the control system of FIG. 6 for balancing unbalanced phase currents of the three-phase electric motor 310 of a wellbore ESP artificial lift system. It should be understood that the topology of the control system represented in FIG. 7 is provided only for purposes of illustration, and nothing herein is to be interpreted as limiting examples of the present disclosure to use with the particular control system topology depicted in FIG. 7. Further, there may be other components of the control system that are not shown in FIG. 7, whether for reasons of irrelevancy, clarity, or otherwise.

As indicated in FIG. 7, and as discussed above, the controller block 302 is provided to cause an inverter 312 of the inverter block 308 to control the electric motor 310 of an ESP system in a balanced current condition, based on at least the values of the three phase currents at the electric motor 310 as measured by sensors 350 (see FIG. 6) and input commands from a user interface 306 (see FIG. 6) that is communicatively coupled to the controller block 302. In addition to a plurality of switches, the inverter block 308 can also include an input filter 346 as may be required to meet power quality requirements typically mandated by the local power utility, and/or an output sine filter 348 that can be used to filter out PWM switching harmonics that can impact the integrity of the motor insulation system.

The controller block 302 can include one or more sub-blocks and sub-block components that perform various functions associated with controlling the electric motor 310 in a balanced current condition. For example, a speed and position estimator component 314 can output an estimated motor shaft angular position value θ along with an estimated motor shaft speed value w. The speed and position estimator component 314 may comprise a model of the electric motor 310 and an associated electric cable 328. Through measurements of voltage and currents at the well surface, a phase lock loop algorithm can be used to estimate the prevalent phase and frequency of the measured input signals. The estimated angular position θ and speed ω values provided by the speed and position estimator component 314 can be used in subsequent coordinate system (reference frame) transformation steps required to control the electric motor 310 in accordance with the present disclosure.

A stator reference conversion component 316 can receive from the sensors 350 (see FIG. 6) values of the three-phase currents ia, ib, ic at the output of the inverter block 308 and the estimated motor shaft angular position θ value provided by the speed and position estimator component 314. The stator reference conversion component 316 can use this information to convert the measured three-phase motor currents to the stator reference frame α and β.

A current components extraction component 318 can receive the stator reference frame phase current values α and β from the stator reference conversion component 316. The current components extraction component 318 may extract the positive-sequence current components and the and the negative-sequence current components from the stator reference frame phase current values α and β. The positive-sequence $\text{Iabc}^{dqp}$ component and the negative-sequence $\text{Iabc}^{dqn}$ component of the motor current extracted by the current components extraction component 318 are then respectively provided to a positive-sequence current controller 320 and negative-sequence current controller 322.

The positive-sequence current controller 320 and the negative-sequence current controller 322 can be configured to respectively control the positive-sequence phase current and the negative-sequence phase current according to commands set by proportional-integral (PI) controllers 324, 326. The PI controller 324 may also receive input data from the speed and position estimator 314, and may output a motor torque value Iqp* that can be used to set a motor torque target that will maintain the value of the motor speed reference ω*.

Figure 8A:
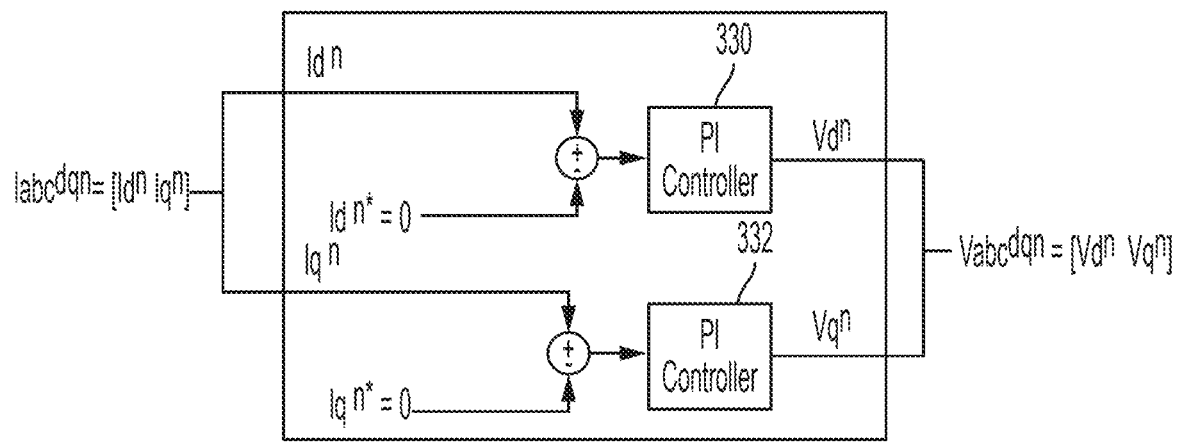
FIG. 8A is a block diagram presenting details of negative-sequence current controller and FIG. 8B is a block diagram presenting details of a positive-sequence current controller, according to one example of the present disclosure.
Figure 8B:
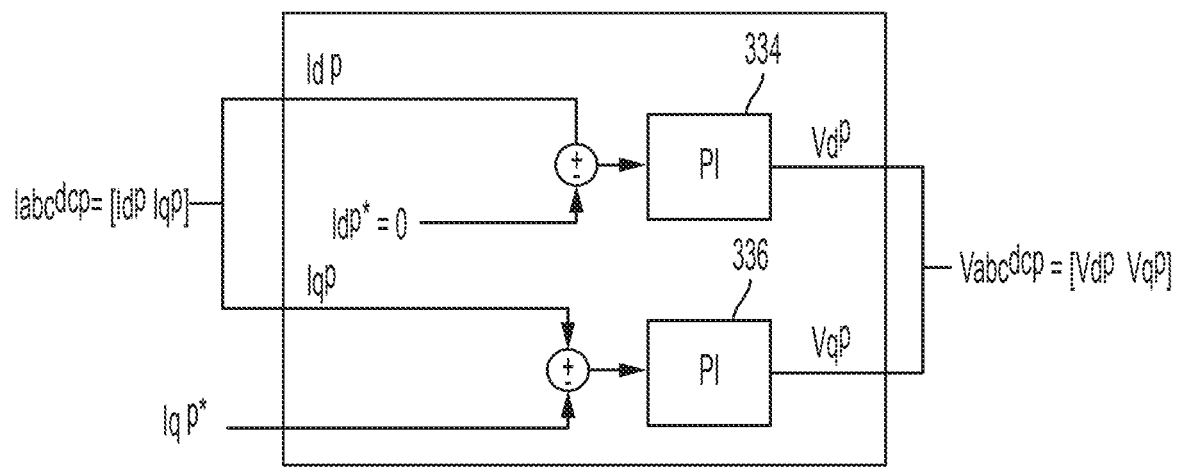

FIGS. 8A-8B are schematic diagrams respectively presenting further details regarding the operations of the negative-sequence current controller 322 and positive-sequence current controller 320 shown in FIG. 7. As indicated in FIG. 8A, and as described above, the negative-sequence current controller 322 receives the extracted negative-sequence current values $Id''$ and $Iq''$ expressed in the rotor reference frame from the current components extraction component 318. The negative-sequence current controller 322 then compares the extracted negative-sequence current values $Id''$ and $Iq''$ to their associated reference values $Id''^*$ and $Iq''^*$, which are provided by the PI controller 326 (see FIG. 7). To ensure the negative sequence currents are reduced to zero, both of the reference values $Id''^*$ and $Iq''^*$ can be set to zero. The result of comparing the current value $Id''$ to its associated reference value $Id''^*$ is provided to a first PI controller 330 of the negative-sequence current controller 322, and the first PI controller 330 outputs a voltage command $Vd''$. Likewise, the result of comparing the current value $Iq''$ to its associated reference value $Iq''^*$ is provided to a second PI controller 332 of the negative-sequence current controller 322, and the second PI controller 332 outputs a voltage command $Vq''$. The resultant output of the negative-sequence current controller 322 is then a rotor reference frame output voltage command $Vabc^{dqn}$.

As indicated in FIG. 8B, the positive-sequence current controller 320 receives the extracted positive-sequence current values $Id^p$ and $Iq^p$ expressed in the rotor reference frame from the current components extraction component 318. The positive-sequence current controller 320 then compares the extracted positive-sequence current values $Id^p$ and $Iq^p$ to their associated reference values $Id^{p*}$ and $Iq^{p*}$, which are provided by the PI controller 324 (see FIG. 7). The positive-sequence current controller 320 can also receive as an input the motor torque value $Iq^{p*}$ output by the PI controller 324. The result of comparing the current value $Id^p$ to its associated reference value $Id^{p*}$ is provided to a first PI controller 334 of the positive-sequence current controller 320, and the first PI controller 334 outputs a voltage command $Vd^p$. Likewise, the result of comparing the current value $Iq^p$ to its associated reference value $Iq^{p*}$ is provided to a second PI controller 336 of the positive-sequence current controller 320, and the second PI controller 336 outputs a voltage command $Vq^p$. The resultant output of the positive-sequence current controller 320 is then a rotor reference frame output voltage command $Vabc^{dqp}$.

With reference again to FIG. 7, it can be better understood that the voltage command $Vabc^{dqn}$ from the negative-sequence current controller 322 and the voltage command $Vabc^{dqp}$ from the positive-sequence current controller 320 each need to be integrated to produce a single input command to a PWM controller 338 of the controller block 302. In this regard, the voltage command $Vabc^{dqn}$ from the negative-sequence current controller 322 is input to a first stator reference conversion component 340, and the voltage command $Vabc^{dqp}$ from the positive-sequence current controller 320 is input to a second stator reference conversion component 342. The first stator reference conversion component 340 uses the previously described estimated position value $\theta$ and estimated speed $\omega$ to convert the $Vabc^{dqn}$ voltage command output by the negative-sequence current controller 322 in a rotor frame of reference to a voltage command in a stator frame of reference. The second stator reference conversion component 342 uses the previously described estimated position value $\theta$ and estimated speed $\omega$ to convert the $Vabc^{dqp}$ voltage command output by the positive-sequence current controller 320 in a rotor frame of reference to a voltage command in a stator frame of reference. The converted negative-sequence voltage command generated by the first stator reference conversion component 340 and the converted positive-sequence voltage command generated by the second stator reference conversion component 342 are then combined to provide an overall voltage Vabc ($\alpha\beta$) command in the stator frame of reference.

The overall voltage command Vabc ($\alpha\beta$) command in the stator frame of reference is subsequently input to an abc reference frame conversion component 344, to produce an overall voltage command Vabc. The voltage command Vabc from the abc reference frame conversion component 344 can then serve as input to the PWM controller 338 of the controller block 302 to generate an inverter switching pattern that will control the electric motor 310 in the desired manner. More specifically, the three voltage signal commands Va, Vb, Vc of the overall voltage command Vabc include voltage imbalance information required to balance the currents against the unbalanced impedance of the cable. Thus, the voltage commands supplied to the PWM controller 338 will achieve a balanced current. The negative-sequence current controller 322 and the positive-sequence current controller 320 continually adjust the voltage commands to eliminate the negative sequence from the motor currents and to ensure that a balanced current is maintained during operation of the electric motor 310.

Figure 9:
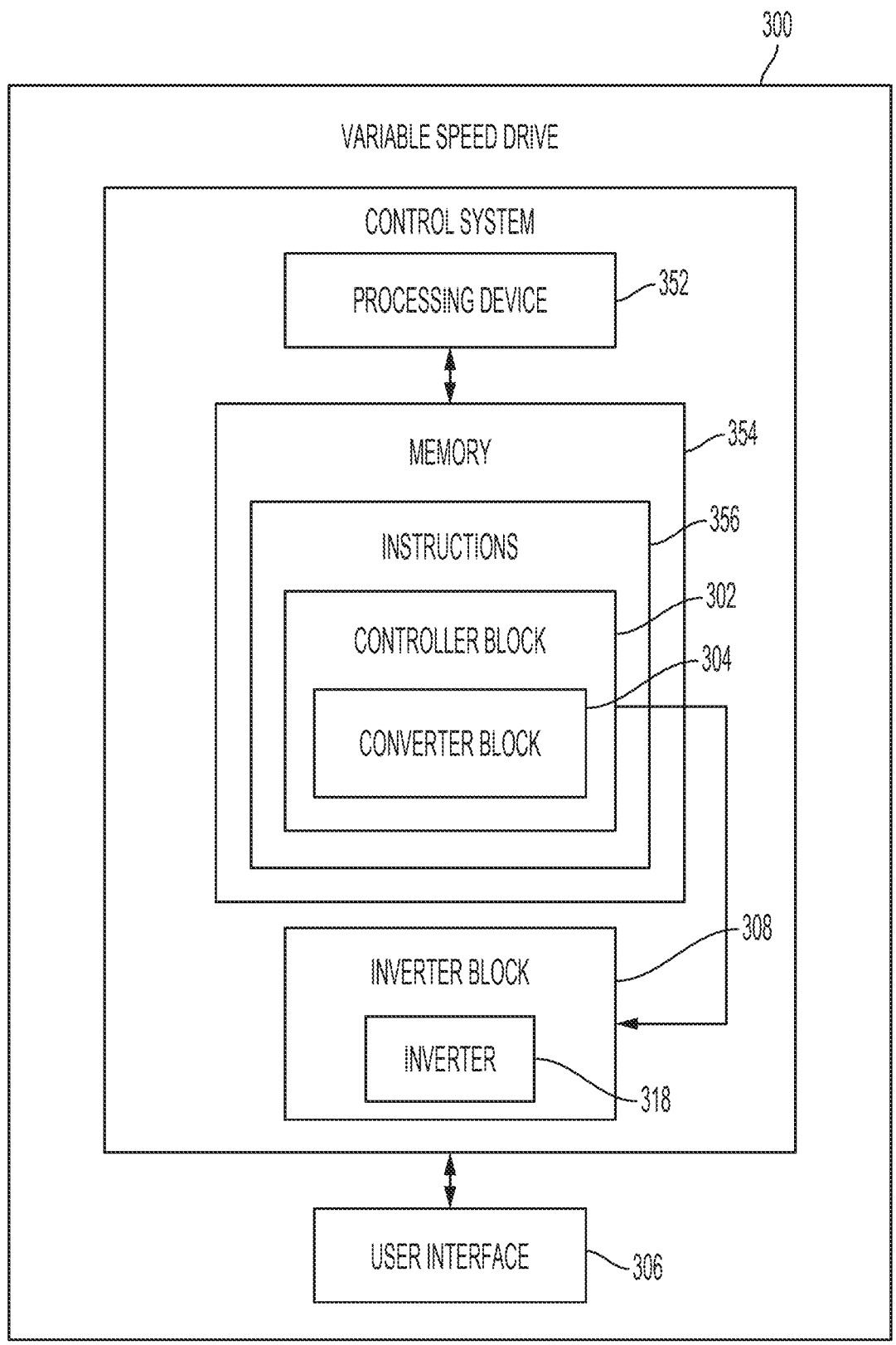
FIG. 9 is a schematic diagram depicting an architecture of a system for balancing supplied electric currents against the unbalanced impedance of a power cable according to one example of the present disclosure.

FIG. 9 is a block diagram depicting various components of one example of a control system architecture according to the present disclosure, such as the control system architecture of the variable speed drive 300 represented in FIG. 7.

The variable speed drive 300 may be located on the surface near a wellbore and can be electrically coupled to an electric motor that drives a pump of an ESP artificial lift system, such as the electric motor 116 of FIG. 1 or the electric motor 310 represented diagrammatically in FIGS. 6-7. The variable speed drive 300 may be electrically coupled to the electric motor 310 by an electric cable having an impedance imbalance. The variable speed drive 300 allows the electric motor 310, and consequently the pump of the ESP system to be selectively operated at different speeds.

The control system includes a processing device 352 that is communicatively coupled to a memory 354. The processing device 352 can include one processing device or multiple processing devices. Non-limiting examples of the processing device 352 include a Field-Programmable Gate Array (FPGA), an application-specific integrated circuit (ASIC), a microprocessor, etc.

The memory 354 can include one memory or multiple memories. The memory 354 can be non-volatile and may include any type of memory that retains stored information when powered off. Non-limiting examples of the memory 354 include electrically erasable and programmable read-only memory (EEPROM), flash memory, or any other type of non-volatile memory. At least some of the memory 354 can be a non-transitory computer-readable medium from which the processing device 352 can read instructions 356 stored in the memory. A computer-readable medium can include electronic, optical, magnetic, or other storage devices capable of providing the processing device 352 with computer-readable instructions or other program code. Non-limiting examples of a computer-readable medium include magnetic disk(s), memory chip(s), ROM, random-access memory (RAM), an ASIC, a configured processor, optical storage, or any other medium from which the processing device 352 can read the instructions 356. In some examples, the instructions 356 can include processor-specific instructions generated by a compiler or an interpreter from code written in a suitable computer-programming language, such as C, C++, C#, etc.

The operations of the controller block 302 and the various other blocks (e.g., converter block 304, inverter block 308) of the control system may be written into the instructions 356. The processing device 352 can execute the instructions 356 stored in the memory 354 to cause the controller block 302 and the other blocks to perform their designated operations, which ultimately results in the PWM controller 338 of the controller block 302 issuing switching commands to the inverter 312 of the inverter block 308 to control the electric motor 310 of the ESP system in a balanced current condition despite the impedance imbalance in the electric cable 328 coupling the electric motor 310 to the variable speed drive 300.

A user interface, such as the user interface 306 of FIG. 6, may be communicatively coupled with the control system. The user interface 306 can provide user access to the control system for purposes such as but not limited to, storing the computer-readable instructions 356 in the memory 354 of the control system, and for inputting commands that cause the processing device 352 to perform the operations written in the computer-readable instructions 356. As such, a user may also manually initiate the process of contending with unbalanced currents present at the electric motor 310 through the user interface 306.

Figure 10:
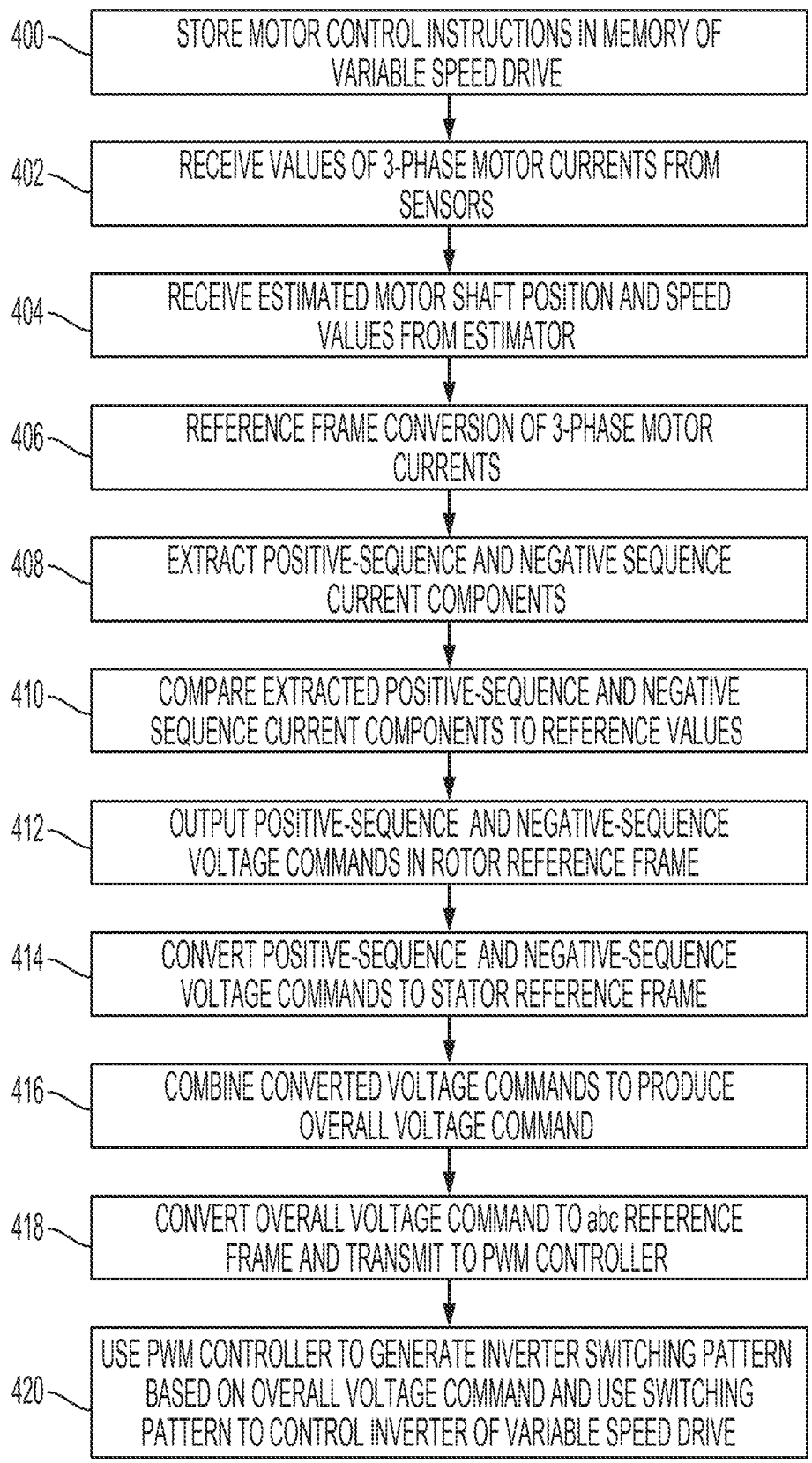
FIG. 10 is a flowchart representing a method of balancing supplied electric currents against the unbalanced impedance of a power cable according to one example of the present disclosure.

A flowchart representing one example of a method according to the current disclosure is presented in FIG. 10. At block 400, computer-executable instructions for controlling an electric motor of an ESP system in a balanced current condition are stored (or may have been previously stored) in a memory of a control system of a variable speed drive, such as the variable speed drive control system represented in FIG. 9. At block 402, values of three-phase motor currents measured at an output of an inverter of the variable speed drive are received from one or more sensors, and at block 404, an estimated motor shaft angular position value and an estimated motor shaft speed value are received from a speed and position estimator. At block 406, the measured three-phase motor currents are converted from an abc reference frame to stator reference frame phase current values by a stator reference conversion component. At block 408, positive-sequence current components and negative-sequence current components are extracted from the stator reference frame phase current values by a current components extraction component. At block 410, the extracted negative-sequence current components and the extracted positive-sequence current components are compared by corresponding negative-sequence and positive-sequence current controllers to respective reference values provided by associated proportional-integral controllers. At block 412, each of the negative-sequence current controller and the positive-sequence current controller outputs a voltage command in a rotor reference frame, and the voltage commands are subsequently converted to voltage commands in a stator reference frame by respective first and second stator reference conversion components at block 414. According to block 416, the negative-sequence voltage command in the stator reference frame and the positive-sequence voltage command in the stator reference frame are then combined to produce an overall voltage command in the stator reference frame. At block 418, the overall voltage command in the stator reference frame is converted by an abc reference frame conversion component to an overall voltage command in an abc reference frame, and the overall voltage command in the abc reference frame is transmitted to a PWM controller that is communicatively coupled to an inverter of the variable speed drive. At block 420, The PWM controller generates, based on the received overall voltage command, an inverter switching pattern that will control the electric motor of the electric submersible pump system in a balanced current condition, and the inverter switching pattern is transmitted to and used by the inverter of the variable speed drive to control the electric motor.

While system and method examples have been described in the present disclosure relative to overcoming problems resulting from the impedance mismatch of electric cables having a flat geometry, systems and methods according to examples of the present disclosure can also be applied to overcome similar problems associated with cables having other geometries. For example, while electric cables having a flat geometry tend to have a more severe impedance mismatch, it is possible for electric cables with a round geometry or another non-flat geometry to also exhibit some degree of impedance mismatch. Therefore, it is to be understood that systems and methods according to examples of the present disclosure can also be used to contend with unbalanced currents present at a three-phase electric motor that are caused by an impedance mismatch of an electric cable having a geometry other than a flat geometry.

In some aspects, systems, methods, and non-transitory computer-readable mediums, for controlling an electric motor of an ESP system in a balanced current condition are provided according to one or more of the following examples. As used below, any reference to a series of examples is to be understood as a reference to each of those examples disjunctively (e.g., "Examples 1-4" is to be understood as "Examples 1, 2, 3, or 4").

Example 1 is a variable speed drive for controlling an electric motor of an electric submersible pump system, comprising: an electric cable over which electric power and control signals are provided to the electric motor by the variable speed drive; a processing device; and memory communicatively coupled to the processing device, the memory including instructions that are executable by the processing device for causing the processing device to control the electric motor of the electric submersible pump system in a balanced current condition despite an impedance imbalance of the electric cable.

Example 2 is the variable speed drive of example 1, wherein: the electric cable has a substantially flat geometry, and three conductors that are located adjacent to one another in substantially a same plane; and the impedance imbalance of the electric cable is caused by differences in inductances and capacitances between the three conductors.

Example 3 is the variable speed drive of example 1, wherein the memory includes instructions that are executable by the processing device for further causing the processing device to: receive, from one or more sensors, values of three-phase motor currents measured at an output of an inverter of the variable speed drive; process the measured three-phase motor current values through a speed and position estimator; and provide an estimated motor shaft angular position value and an estimated motor shaft speed value.

Example 4 is the variable speed drive of example 3, wherein the speed and position estimator comprises a model of each of the electric motor and the electric cable.

Example 5 is the variable speed drive of example 3, wherein the memory includes instructions that are executable by the processing device for further causing the processing device to: convert, by a stator reference conversion component, the measured three-phase motor currents from an abc reference frame to stator reference frame phase current values; extract, by a current components extraction component, positive-sequence current components and negative-sequence current components from the stator reference frame phase current values; compare, by a negative-sequence current controller, the negative-sequence current components extracted by the current components extraction component to associated reference values provided by a proportional-integral controller that is communicatively coupled to the negative-sequence current controller; compare, by a positive-sequence current controller, the positive-sequence current components extracted by the current components extraction component to associated reference values provided by a proportional-integral controller that is communicatively coupled to the positive-sequence current controller; output, by the negative-sequence current controller, an output voltage command in a rotor reference frame; output, by the positive-sequence current controller, an output voltage command in a rotor reference frame; convert, by a first stator reference conversion component, the voltage command output by the negative-sequence current controller in a rotor reference frame to a negative-sequence voltage command in a stator reference frame; convert, by a second stator reference conversion component, the voltage command output by the positive-sequence current controller in a rotor reference frame to a positive-sequence voltage command in a stator reference frame; combine the negative-sequence voltage command in the stator reference frame with the positive-sequence voltage command in the stator reference frame to produce an overall voltage command in the stator reference frame; convert, by an abc reference frame conversion component, the overall voltage command in the stator reference frame, to an overall voltage command in an abc reference frame (Vabc); transmit the overall voltage command in the abc reference frame (Vabc) to a pulse width modulation controller communicatively coupled to the inverter of the variable speed drive; generate, by the pulse width modulation controller an inverter switching pattern that will control the electric motor of the electric submersible pump system in a balanced current condition; and transmit the inverter switching pattern to the inverter of the variable speed drive.

Example 6 is the variable speed drive of example 5, wherein the memory includes instructions that are executable by the processing device for further causing the processing device to integrate the voltage command output by the negative-sequence current controller and the voltage command output by the positive-sequence current controller prior to using the voltage commands to provide the overall voltage command in the stator reference frame.

Example 7 is the variable speed drive of example 5, wherein the memory includes instructions that are executable by the processing device for further causing the processing device to configure the positive-sequence current controller and the negative-sequence current controller to respectively control a positive-sequence phase current and a negative-sequence phase current according to commands set by a proportional-integral controller associated with the negative-sequence current controller and a proportional-integral controller associated with the positive-sequence current controller.

Example 8 is the variable speed drive of example 5, wherein each of three voltage signal commands (Va, Vb, Vc) of the overall voltage command (Vabc) in the abc reference frame include voltage imbalance information required to balance the currents against an impedance imbalance of the electric cable.

Example 9 is a computer-implemented method comprising: storing in a memory of a variable speed drive, instructions that are executable by a processing device of the variable speed drive to cause the processing device to control an electric motor of an electric submersible pump system in a balanced current condition despite an impedance imbalance of an electric cable connecting the electric motor to the variable speed drive; and controlling the electric motor in a balanced current condition during operation of the electric submersible pump system by causing the processing device to execute the instructions.

Example 10 is the computer-implemented method of example 9, wherein the processing device controls the electric motor in a balanced current condition by: receiving, from one or more sensors, values of three-phase motor currents measured at an output of an inverter of the variable speed drive; processing, by a speed and position estimator, the measured three-phase motor current values; receiving, from the speed and position estimator, an estimated motor shaft angular position value and an estimated motor shaft speed value; converting, by a stator reference conversion component, the measured three-phase motor currents from an abc reference frame to stator reference frame phase current values; extracting, by a current components extraction component, positive-sequence current components and negative-sequence current components from the stator reference frame phase current values; comparing, by a negative-sequence current controller, the negative-sequence current components extracted by the current components extraction component to associated reference values provided by a proportional-integral controller that is communicatively coupled to the negative-sequence current controller; comparing, by a positive-sequence current controller, the positive-sequence current components extracted by the current components extraction component to associated reference values provided by a proportional-integral controller that is communicatively coupled to the positive-sequence current controller; outputting, by the negative-sequence current controller, an output voltage command in a rotor reference frame; outputting, by the positive-sequence current controller, an output voltage command in a rotor reference frame; converting, by a first stator reference conversion component, the voltage command output by the negative-sequence current controller in a rotor reference frame to a negative-sequence voltage command in a stator reference frame; converting, by a second stator reference conversion component, the voltage command output by the positive-sequence current controller in a rotor reference frame to a positive-sequence voltage command in a stator reference frame; combining the negative-sequence voltage command in the stator reference frame with the positive-sequence voltage command in the stator reference frame to produce an overall voltage command in the stator reference frame; converting, by an abc reference frame conversion component, the overall voltage command in the stator reference frame, to an overall voltage command in an abc reference frame (Vabc); transmitting the overall voltage command in the abc reference frame (Vabc) to a pulse width modulation controller communicatively coupled to the inverter of the variable speed drive; generating, by the pulse width modulation controller, an inverter switching pattern that will control the electric motor of the electric submersible pump system in a balanced current condition; and transmitting the inverter switching pattern to the inverter of the variable speed drive.

Example 11 is the computer-implemented method of example 10, wherein the associated reference values provided by the proportional-integral controller that is communicatively coupled to the negative-sequence current controller and the associated reference values provided by the proportional-integral controller that is communicatively coupled to the positive-sequence current controller are set to zero to ensure the negative sequence currents are reduced to zero.

Example 12 is the computer-implemented method of example 10, wherein: results of comparing the negative-sequence current components extracted by the current components extraction component to their associated reference values are respectively provided to proportional-integral controllers associated with the negative-sequence current controller, and the negative-sequence current controller resultantly outputs the voltage command in the rotor reference frame; and results of comparing the positive-sequence current components extracted by the current components extraction component to their associated reference values are respectively provided to proportional-integral controllers associated with the positive-sequence current controller, and the positive-sequence current controller resultantly outputs the voltage command in the rotor reference frame.

Example 13 is the computer-implemented method of example 10, wherein: the first stator reference conversion component uses the estimated motor shaft angular position value and an estimated motor shaft speed value to convert the voltage command output by the negative-sequence current controller in the rotor reference frame to the voltage command in the stator reference frame; and the second stator reference conversion component uses the estimated motor shaft angular position value and an estimated motor shaft speed value to convert the voltage command output by the negative-sequence current controller in the rotor reference frame to the voltage command in the stator reference frame.

Example 14 is the computer-implemented method of example 10, further comprising integrating the voltage command output by the negative-sequence current controller and the voltage command output by the positive-sequence current controller prior to using the voltage commands to provide the overall voltage command in the stator reference frame.

Example 15 is the computer-implemented method of example 10, wherein each of three voltage signal commands (Va, Vb, Vc) of the overall voltage command in the abc reference frame (Vabc) include voltage imbalance information required to balance the currents against the impedance imbalance of the electric cable.

Example 16 is the computer-implemented method of example 10, wherein the negative-sequence current controller and the positive-sequence current controller ensure that a balanced current is maintained during operation of the electric motor by continually adjusting the voltage commands output therefrom to eliminate the negative sequence from the motor currents.

Example 17 is a non-transitory computer-readable medium comprising instructions that are executable by a processing device of a variable speed drive for causing the processing device to perform operations comprising controlling an electric motor of an electric submersible pump system in a balanced current condition despite an impedance imbalance of an electric cable connecting the electric motor to the variable speed drive.

Example 18 is the non-transitory computer-readable medium of example 17, wherein the instructions are executable by the processing device for causing the processing device to: receive, from one or more sensors, values of three-phase motor currents measured at an output of an inverter of the variable speed drive; process, by a speed and position estimator, the measured three-phase motor current values; and receive, from the speed and position estimator, an estimated motor shaft angular position value and an estimated motor shaft speed value.

Example 19 is the non-transitory computer-readable medium of example 18, wherein the speed and position estimator comprises a model of each of the electric motor and the electric cable.

Example 20 is the non-transitory computer-readable medium of example 18, wherein the instructions are executable by the processing device for further causing the processing device to: convert, by a stator reference conversion component, the measured three-phase motor currents from an abc reference frame to stator reference frame phase current values; extract, by a current components extraction component, positive-sequence current components and negative-sequence current components from the stator reference frame phase current values; compare, by a negative-sequence current controller, the negative-sequence current components extracted by the current components extraction component to associated reference values provided by a proportional-integral controller that is communicatively coupled to the negative-sequence current controller; compare, by a positive-sequence current controller, the positive-sequence current components extracted by the current components extraction component to associated reference values provided by a proportional-integral controller that is communicatively coupled to the positive-sequence current controller; output, by the negative-sequence current controller, an output voltage command in a rotor reference frame; output, by the positive-sequence current controller, an output voltage command in a rotor reference frame; convert, by a first stator reference conversion component, the voltage command output by the negative-sequence current controller in a rotor reference frame to a negative-sequence voltage command in a stator reference frame; convert, by a second stator reference conversion component, the voltage command output by the positive-sequence current controller in a rotor reference frame to a positive-sequence voltage command in a stator reference frame; combine the negative-sequence voltage command in the stator reference frame with the positive-sequence voltage command in the stator reference frame to produce an overall voltage command in the stator reference frame; convert, by an abc reference frame conversion component, the overall voltage command in the stator reference frame, to an overall voltage command in an abc reference frame (Vabc); transmit the overall voltage command in the abc reference frame (Vabc) to a pulse width modulation controller communicatively coupled to the inverter of the variable speed drive; generate, by the pulse width modulation controller an inverter switching pattern that will control the electric motor of the electric submersible pump system in a balanced current condition; and transmit the inverter switching pattern to the inverter of the variable speed drive.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A variable speed drive for controlling an electric motor of an electric submersible pump system, comprising:
   an electric cable of imbalanced impedance over which electric power and control signals are provided to the electric motor by the variable speed drive; and
   a control system comprising a processing device and memory communicatively coupled to the processing device, the memory including instructions that are executable by the processing device for causing the control system to control the electric motor of the electric submersible pump system in a balanced current condition despite an impedance imbalance of the electric cable by performing operations comprising:
      converting motor current values that are in an abc reference frame from an output of an inverter of the variable speed drive to phase current values that are in a stator reference frame,
      producing a voltage command in the stator reference frame by generating, from negative-sequence and positive-sequence voltage commands in a rotor reference frame produced from positive and negative components of the phase current values, a negative-sequence voltage command and a positive-sequence voltage command in the stator reference frame and combining the stator reference frame negative-sequence and positive-sequence voltage commands,
      converting the voltage command in the stator reference frame to a voltage command in the abc reference frame, and
      transmitting the voltage command in the abc reference frame to a pulse width modulation controller communicatively coupled to the inverter of the variable speed drive to generate an inverter switching pattern via which the electric motor of the electric submersible pump system is controllable in a balanced current condition despite the impedance imbalance of the electric cable.

2. The variable speed drive of claim 1, wherein:
the electric cable has a substantially flat geometry, and three conductors that are located adjacent to one another in substantially a same plane; and
the impedance imbalance of the electric cable is caused by differences in inductances and capacitances between the three conductors.

3. The variable speed drive of claim 1, wherein the operations further comprise:
receiving the motor current values in the abc reference frame from one or more sensors arranged to measure three-phase motor currents at the output of the inverter;
processing the measured three-phase motor current values through a speed and position estimator; and
providing an estimated motor shaft angular position value and an estimated motor shaft speed value.

4. The variable speed drive of claim 3, wherein the speed and position estimator comprises a model of each of the electric motor and the electric cable.

5. The variable speed drive of claim 1, wherein the control system further comprises:
an initial stator reference conversion component to convert the motor currents from the abc reference frame to the stator reference frame phase current values;
a current components extraction component to extract the negative-sequence and the positive-sequence current components, in a rotor reference frame, from the stator reference frame phase current values;
a negative-sequence current controller to compare the rotor reference frame negative-sequence current component extracted by the current components extraction component to an associated reference value provided by a proportional-integral controller that is communicatively coupled to the negative-sequence current controller, and to output the negative-sequence voltage command in the rotor reference frame;
a positive-sequence current controller to compare the rotor reference frame positive-sequence current component extracted by the current components extraction component to an associated reference value provided by a proportional-integral controller that is communicatively coupled to the positive-sequence current controller, and to output the positive-sequence voltage command in the rotor reference frame;
a first stator reference conversion component to convert the voltage command output by the negative-sequence current controller in the rotor reference frame to the negative-sequence voltage command in the stator reference frame;
a second stator reference conversion component to convert the voltage command output by the positive-sequence current controller in the rotor reference frame to the positive-sequence voltage command in the stator reference frame;
an abc reference frame conversion component to convert the voltage command in the stator reference frame to the voltage command in the abc reference frame (Vabc); and
wherein the operations further comprise transmitting the inverter switching pattern from the pulse width modulation controller to the inverter of the variable speed drive.

6. The variable speed drive of claim 5, wherein the operations further comprise integrating the voltage commands output by the negative-sequence current controller and the positive-sequence current controller in the rotor reference frame prior to using the voltage commands to produce the voltage command in the stator reference frame.

7. The variable speed drive of claim 5, wherein the operations further comprise configuring the positive-sequence current controller and the negative-sequence current controller to respectively control a positive-sequence phase current and a negative-sequence phase current according to commands set by a proportional-integral controller associated with the positive-sequence current controller and a proportional-integral controller associated with the negative-sequence current controller.

8. The variable speed drive of claim 1, wherein the voltage command in the abc reference frame includes three voltage signal commands (Va, Vb, Vc) and each of three voltage signal commands (Va, Vb, Vc) includes voltage imbalance information required to balance the motor currents against an impedance imbalance of the electric cable.

9. A computer-implemented method comprising:
storing in a memory of a variable speed drive, instructions that are executable by a processing device of a control system of the variable speed drive to control an electric motor of an electric submersible pump system in a balanced current condition despite an impedance imbalance of an electric cable connecting the electric motor to the variable speed drive; and
controlling the electric motor in a balanced current condition during operation of the electric submersible pump system by executing the instructions by the processor to cause the control system to perform operations comprising:
converting motor current values that are in an abc reference frame from an output of an inverter of the variable speed drive to phase current values that are in a stator reference frame,
producing a voltage command in the stator reference frame by generating, from negative-sequence and positive-sequence voltage commands in a rotor reference frame produced from positive and negative components of the phase current values, a negative-sequence voltage command and a positive-sequence voltage command in the stator reference frame and combining the stator reference frame negative-sequence and positive-sequence voltage commands,
converting the voltage command in the stator reference frame to a voltage command in the abc reference frame,
transmitting the voltage command in the abc reference frame to a pulse width modulation controller communicatively coupled to the inverter of the variable speed drive to generate an inverter switching pattern via which the electric motor of the electric submersible pump system is controllable in a balanced current condition despite the impedance imbalance of the electric cable, and
transmitting the inverter switching pattern from the pulse width modulation controller to the inverter of the variable speed drive.

10. The computer-implemented method of claim 9, wherein the control system further:
receives the motor current values from one or more sensors that measure three-phase motor currents at an output of the inverter of the variable speed drive, and
receives an estimated motor shaft angular position value and an estimated motor shaft speed value from a speed and position estimator that processes the measured three-phase motor currents;
extracts the positive-sequence and the negative-sequence current components, in a rotor reference frame, from the stator reference frame phase current values;
compares the extracted negative-sequence current component to an associated reference value provided by a first proportional-integral controller and resultantly outputs the negative-sequence voltage command in the rotor reference frame;
compares the extracted positive-sequence current component to an associated reference value provided by a second proportional-integral controller and resultantly outputs the positive-sequence voltage command in the rotor reference frame;
converts the negative-sequence voltage command in the rotor reference frame to the negative-sequence voltage command in the stator reference frame; and
converts the positive-sequence voltage command in the rotor reference frame to the positive-sequence voltage command in the stator reference frame.

11. The computer-implemented method of claim 10, wherein the associated reference value provided by the first proportional-integral controller and the associated reference value provided by the second proportional-integral controller are set to zero to ensure the negative sequence currents are reduced to zero.

12. The computer-implemented method of claim 10, wherein:
the extracted negative-sequence current component is compared to the associated reference value provided by the first proportional-integral controller using a negative-sequence current controller;
the extracted positive-sequence current component is compared to the associated reference value provided by the second proportional-integral controller using a positive-sequence current controller;
results of comparing the negative-sequence current component to its associated reference value are respectively provided to proportional-integral controllers associated with the negative-sequence current controller, and the negative-sequence current controller resultantly outputs the voltage command in the rotor reference frame; and
results of comparing the positive-sequence current component to its associated reference value are respectively provided to proportional-integral controllers associated with the positive-sequence current controller, and the positive-sequence current controller resultantly outputs the voltage command in the rotor reference frame.

13. The computer-implemented method of claim 10, wherein:
the control system uses the estimated motor shaft angular position value and the estimated motor shaft speed value to convert the negative-sequence voltage command in the rotor reference frame to the negative-sequence voltage command in the stator reference frame; and
the control system uses the estimated motor shaft angular position value and the estimated motor shaft speed value to convert the positive-sequence voltage command in the rotor reference frame to the positive-sequence voltage command in the stator reference frame.

14. The computer-implemented method of claim 10, further comprising integrating the negative-sequence voltage command in the rotor reference frame and the positive-sequence voltage command in the rotor reference frame prior to converting the negative-sequence and the positive-sequence voltage commands in the rotor reference frame to the negative-sequence and the positive-sequence voltage commands in the stator reference frame.

15. The computer-implemented method of claim 10, wherein a balanced current is maintained during operation of the electric motor by continually adjusting the negative-sequence and the positive-sequence voltage commands in the rotor reference frame to eliminate the negative sequence from the motor currents.

16. The computer-implemented method of claim 9, wherein the voltage command in the abc reference frame includes three voltage signal commands (Va, Vb, Vc) and each of three voltage signal commands (Va, Vb, Vc) includes voltage imbalance information required to balance the motor currents against the impedance imbalance of the electric cable.

17. A non-transitory computer-readable medium comprising instructions that are executable by a processing device of a control system of a variable speed drive to control an electric motor of an electric submersible pump system in a balanced current condition despite an impedance imbalance of an electric cable connecting the electric motor to the variable speed drive by causing the control system to perform operations comprising:
converting motor current values that are in an abc reference frame from an output of an inverter of the variable speed drive to phase current values that are in a stator reference frame,
producing a voltage command in the stator reference frame by generating, from negative-sequence and positive-sequence voltage commands in a rotor reference frame produced from positive and negative components of the phase current values, a negative-sequence voltage command and a positive-sequence voltage command in the stator reference frame and combining the stator reference frame negative-sequence and positive-sequence voltage commands,
converting the voltage command in the stator reference frame to a voltage command in the abc reference frame,
transmitting the voltage command in the abc reference frame to a pulse width modulation controller communicatively coupled to the inverter of the variable speed drive to generate an inverter switching pattern via which the electric motor of the electric submersible pump system is controllable in a balanced current condition despite the impedance imbalance of the electric cable, and
transmitting the inverter switching pattern from the pulse width modulation controller to the inverter of the variable speed drive.

18. The non-transitory computer-readable medium of claim 17, wherein the operations further comprise:
receiving, from one or more sensors, the motor current values as three-phase motor current values measured at an output of the inverter of the variable speed drive;
processing, using a speed and position estimator, the measured three-phase motor current values; and
receiving, from the speed and position estimator, an estimated motor shaft angular position value and an estimated motor shaft speed value.

19. The non-transitory computer-readable medium of claim 18, wherein the speed and position estimator comprises a model of each of the electric motor and the electric cable.

20. The non-transitory computer-readable medium of claim 18, wherein the operations further comprise:
- extracting the positive-sequence and the negative-sequence current components, in a rotor reference frame, from the stator reference frame phase current values;
- comparing the extracted negative-sequence current component to an associated reference value provided by a first proportional-integral controller and resultantly outputting the negative-sequence voltage command in the rotor reference frame;
- comparing the extracted positive-sequence current component to an associated reference value provided by a second proportional-integral controller and resultantly outputting the positive-sequence voltage command in the rotor reference frame;
- converting the negative-sequence voltage command in the rotor reference frame to the negative-sequence voltage command in the stator reference frame; and
- converting the positive-sequence voltage command in the rotor reference frame to the positive-sequence voltage command in the stator reference frame.

* * * * *